Feb. 20, 1962  E. C. BURCH  3,022,015
DUAL CHEMICAL SPRAY VALVE
Filed Nov. 13, 1959
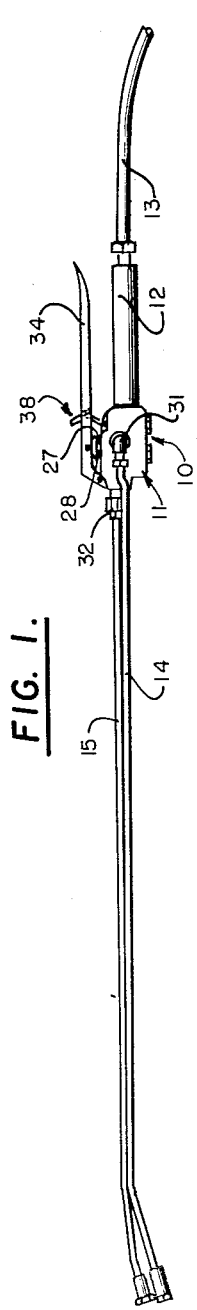
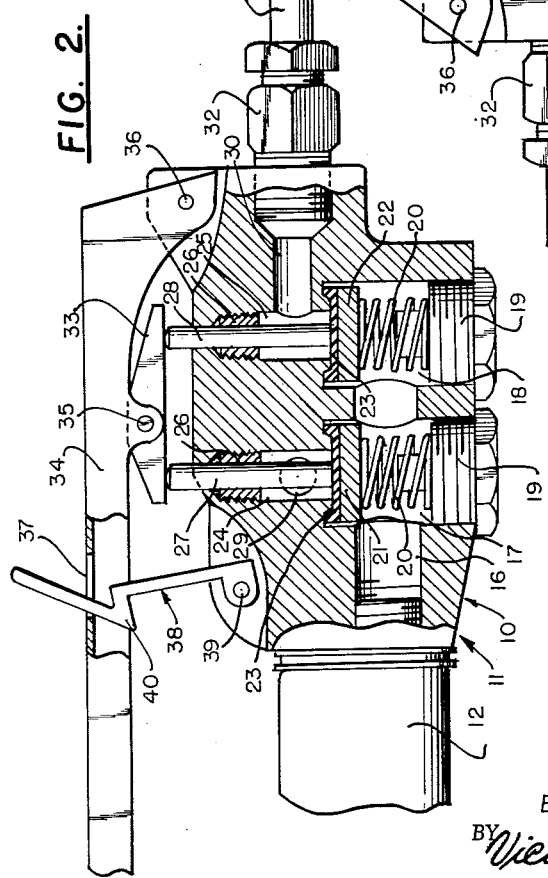
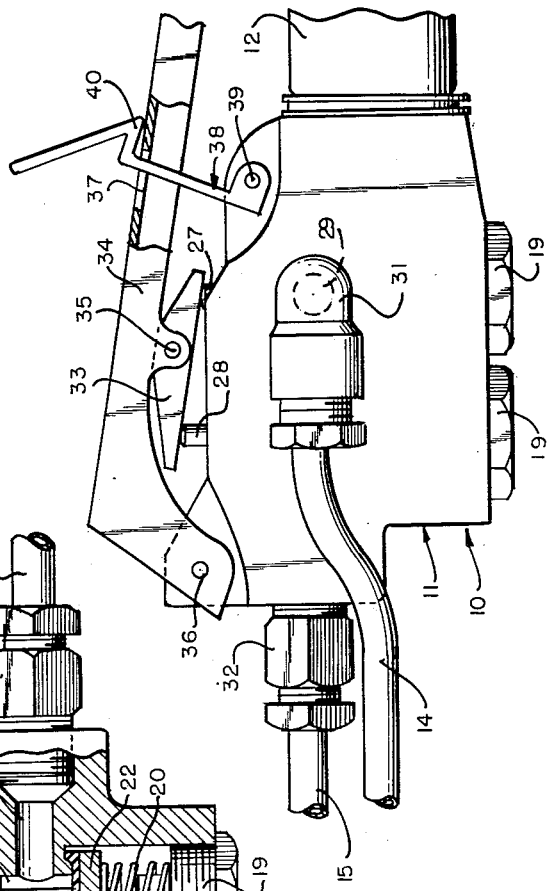
INVENTOR.
Elmer C. Burch
BY *Victor J. Evans & Co.*
ATTORNEYS

United States Patent Office 3,022,015
Patented Feb. 20, 1962

3,022,015
DUAL CHEMICAL SPRAY VALVE
Elmer C. Burch, Paia, Hawaii, assignor to Alexander & Baldwin, Inc., a corporation of Hawaii
Filed Nov. 13, 1959, Ser. No. 852,703
2 Claims. (Cl. 239—444)

This invention relates to a spray valve, and more particularly to a spray valve which can be manually operated to control the flow of fluid outwardly through a pair of outlet conduits or nozzles.

The object of this invention is to provide a spray valve which includes a member that is adapted to be connected to a single source of supply of chemical or liquid, and wherein by manually actuating a lever or handle, the flow of liquid through a pair of outlet tubes or nozzles can be selectively controlled or regulated as desired.

Another object of the invention is to provide a spray valve which is especially suitable for controlling the flow of chemical liquid onto plants, crops or the like, but it is to be understood that the spray valve of the present invention is also suitable or useful for spraying or controlling the dispensing of different types of liquids or fluids as desired.

A further object of the invention is to provide a dual spray valve which is extremely simple and inexpensive to manufacture.

Other objects and advantages will be apparent during the course of the following description.

In the accompanying drawings forming a part of this application, and in which like numerals are used to designate like parts throughout the same:

FIGURE 1 is a side elevational view showing the spray valve of the present invention.

FIGURE 2 is a fragmentary sectional view illustrating certain constructional details of the present invention.

FIGURE 3 is a view showing the lever in shifted position and engaged by the latch.

Referring in detail to the drawings, the numeral 10 indicates the spray device of the present invention which comprises a body member 11 that has a portion 12 which is adapted to be connected to a supply line or conduit 13, and the conduit 13 may be connected to a source of supply such as the tank holding the liquid or chemical which is to be sprayed. A pair of spaced apart conduits or nozzles 14 and 15 are connected to the body member 11, and the outlet conduits 14 and 15 are adapted to have fluid or chemical pass therethrough as for example when plants, crops or the like are being sprayed.

As shown in FIGURE 2 for example the interior of the body member 11 is hollowed out or provided with a fluid inlet passage way 16 which is adapted to receive fluid from the conduit 13, and there is also provided within the body member 11 a pair of spaced apart chambers 17 and 18 which communicate with the passage way 16. Plugs 19 are arranged in threaded engagement with the lower ends of the chambers 17 and 18, and a coil spring 20 engages the inner end of each plug 19. The numerals 21 and 22 indicate pistons or plungers which define valves that engage the coil springs 20. A disc 23 which may be made of a suitable plastic or resilient material is arranged contiguous to each of the plungers 21 and 22.

There is further provided in the body member 11 a pair of spaced apart compartments 24 and 25, and a bushing 26 is arranged in these compartments 24 and 25. Pins or valve stems 27 and 28 are slidably mounted in the bushings 26, and the inner ends of the stems 27 and 28 engage the disc 23 which are adjacent the valves 21 and 22. Communicating with the compartment 24 is an outlet port 29 which has the nozzle or conduit 14 connected thereto through the medium of a fitting or elbow 31. An outlet port 30 is connected to the other compartment 25, and a fitting 32 serves to connect the nozzle 15 to the port 30.

The numeral 33 indicates a bracket which is arranged in engagement with the outer ends of the stems 27 and 28, and the bracket 33 is pivotally connected to a handle or lever 34 as at 35, it being noted that the pin 35 is arranged off center with respect to the ends of the bracket 33. The lever 34 is pivotally connected to the body member 11 by means of a pivot pin 36 and the lever 34 is provided with a slot or cut-out 37. As shown in the drawings there is provided a latch or keeper 38, and the latch 38 is pivotally connected to the body member 11 as at 39. The latch 38 is provided with an off set shoulder 40, and the latch 38 can be used for maintaining the lever 34 in a desired position, as for example the latch can maintain the lever in the position of FIGURE 3 when desired.

From the foregoing, it is apparent that there has been provided a dual chemical spray valve, and in use with the parts arranged as shown in the drawings, it is to be noted that the chemical or liquid which is to be sprayed is adapted to be supplied from a suitable source of supply such as a tank holding the chemicals under pressure and this chemical or liquid will pass from the source of supply to the conduit 13 and then into the portion 12 of the body member 11 and then into the passage way 16.

With the parts arranged as shown in FIGURE 2, no fluid or chemicals will be dispensed or sprayed since the valves 21 and 22 have their discs 23 in closed relationship with respect to the fluid passage ways in the body member 11. However, when it is desired to spray the chemical it is only necessary to manually depress the lever 34 so as to move the parts from the position shown in FIGURE 2 to the position shown in FIGURE 3 and the provision of the pivot pin 36 permits the pivotal movement of the lever 34 to take place. As the lever 34 is pivoted on its pin 36, it will be seen that the cam 33 will be moved and it is to be noted that the bracket 33 is swivelly connected to the lever 34 as at 35, and the pin 35 is arranged off center with respect to the opposite ends of the bracket 33. Hence, this arrangement causes the pin 27 to first be depressed as the lever 34 is initially moved down, and then continued downward movement of the lever 34 will depress the other pin 28 and these pins will cause corresponding downward or inward movement of their respective discs 23 and plunger valves 21 and 22 against the tension of the coil springs 20.

With respect to the pin or stem 27, as this member is pushed inwardly by the cam 33, it will be seen that the fluid can pass through the passage way 16, then through the chamber 17, then through the compartment 24 and out through the ports 29 and then through the fitting 31 and then out through the nozzle or tube 14. When the other stem 28 is depressed or pushed inwardly is adjacent disc 23 and valve 22 will be pushed inwardly so that the chemical or fluid can pass from the passageway 16 into the chamber 18, and then into the compartment 25 and out through the port 30 and then through the fitting 32 and then out through the discharge nozzle 15.

Thus, it will be seen that according to the present invention the lever 34 can be actuated to either permit flow of fluid through the discharge nozzle 14 only, or else fluids can be permitted to discharge through both nozzles 14 and 15 simultaneously so that a means is provided for regulating the spray which issues from the device. The latch 38 is pivoted as at 39, and the latch includes the off-set shoulder 40 which can be positioned as shown in FIGURE 3 is order to retain or maintain the lever 34 at its downward pivoted position, and when it is desired to release the lever 34 the latch 38 can be shifted from the position shown in FIGURE 3 as for example to the position shown in FIGURE 2.

The parts can be made of any suitable material and in different shapes or sizes.

It is to be noted that in the present invention both valves are incorporated in a single housing or body member. If desired, a spring member may be provided for urging or biasing the lever 34 to its uppermost position. It will be seen that according to the present invention there has been provided a two nozzle, single triggered spray boom which is especially suitable for spraying chemicals as for example for herbicide control and in the spraying of herbicides, fungicides, insecticides, bactericides and other control liquids, as well as paints and coatings, a steady flow can be intermittently augmented with an additional flow by additional pull on the single trigger or lever 34. Suitable accessories such as packing can be used wherever desired or required, and likewise gaskets can be provided in order to insure that there will be fluid type seals, at the proper points. The members 26 function as guides for the slidable valve stems 27 and 28. The portion 12 of the device may have a strainer or filter therein, and such strainer may be of conventional construction. The long handle or lever 34 is convenient to grip and actuate in order to control the spraying of the chemical or other material.

Minor changes in shape, size and rearrangement of details coming within the field of invention claimed may be resorted to in actual practice, if desired.

What is claimed is:

1. A spray device comprising a conduit for connection to a source of supply of fluid, a body member having a portion connected to said conduit, said body member having a fluid inlet passageway in the interior thereof, there being a pair of spaced apart chambers in said body member which communicate with said passageway, a pair of plugs threadedly mounted in the lower ends of said chambers, piston valves arranged in spaced apart relation with respect to said plugs, coil springs interposed between said plugs and piston valves, a disc of resilient material arranged contiguous to each valve, said body member having a pair of spaced apart hollow compartments which communicate with said chambers, bushings mounted in said compartments, piston valve stems slidably extending through said bushings and the inner ends of said stems engaging said discs, outlet ports connected to said compartments, spaced apart discharge nozzles connected to said outlet ports, said stems having their outer ends projecting beyond the top of the body member, a bracket engaging the outer end of the stems, a manually operable lever pivotally connected to said body member, a pin pivotally connecting said lever to said bracket, said last-named pin being arranged off center with respect to the ends of the bracket, a latch having one end pivotally connected to said body member, there being a slot in said lever for the projection therethrough of said latch, and said latch embodying an off-set shoulder portion intermediate its ends, and said latch providing a means for selectively maintaining the lever in a desired position.

2. A spray device comprising a conduit for connection to a source of supply of fluid, a body member having a portion connected to said conduit, said body member having a fluid inlet passageway in the interior thereof, there being a pair of spaced apart chambers in said body member which communicate with said passageway, a pair of plugs threadedly mounted in the lower ends of said chambers, piston valves arranged in spaced apart relation with respect to said plugs, coil springs interposed between the inner ends of said plugs and piston valves, a resilient disc positioned adjacent to each valve, said body member having a pair of spaced apart hollow compartments which communicate with said chambers, bushings mounted in said compartments, piston valve stems slidably extending through said bushings and the inner ends of said stems engaging said discs, said bushings functioning as guides for the slidable valve stems, outlet ports connected to said compartments, spaced apart discharge nozzles connected to said outlet ports, said stems having their outer ends projecting beyond the top of the body member, a bracket engaging the outer end of the stems, a manually operable lever pivotally connected to said body member, a pin pivotally connecting said lever to said bracket, said last-named pin being arranged off center with respect to the ends of the bracket, a latch having one end pivotally connected to said body member, there being a slot in said lever for the projection therethrough of said latch, and said latch embodying an off-set shoulder portion intermediate its ends, and said latch providing a means for selectively maintaining the lever in a desired position, said lever being of elongated formation so as to define a long handle which is convenient to grip and actuate in order to control the spraying of the fluid.

References Cited in the file of this patent

UNITED STATES PATENTS

| 928,682 | Mikorey et al. | July 20, 1909 |
| 1,094,761 | Thousand | Apr. 28, 1914 |
| 1,981,704 | Moore | Nov. 20, 1934 |

FOREIGN PATENTS

| 59,163 | Austria | May 26, 1913 |
| 505,076 | Italy | Dec. 15, 1954 |